Sept. 20, 1966         C. GOODACRE         3,273,665

RUNNING GEAR ARRANGEMENT FOR INDUSTRIAL TRUCKS

Filed Aug. 4, 1964         3 Sheets-Sheet 1

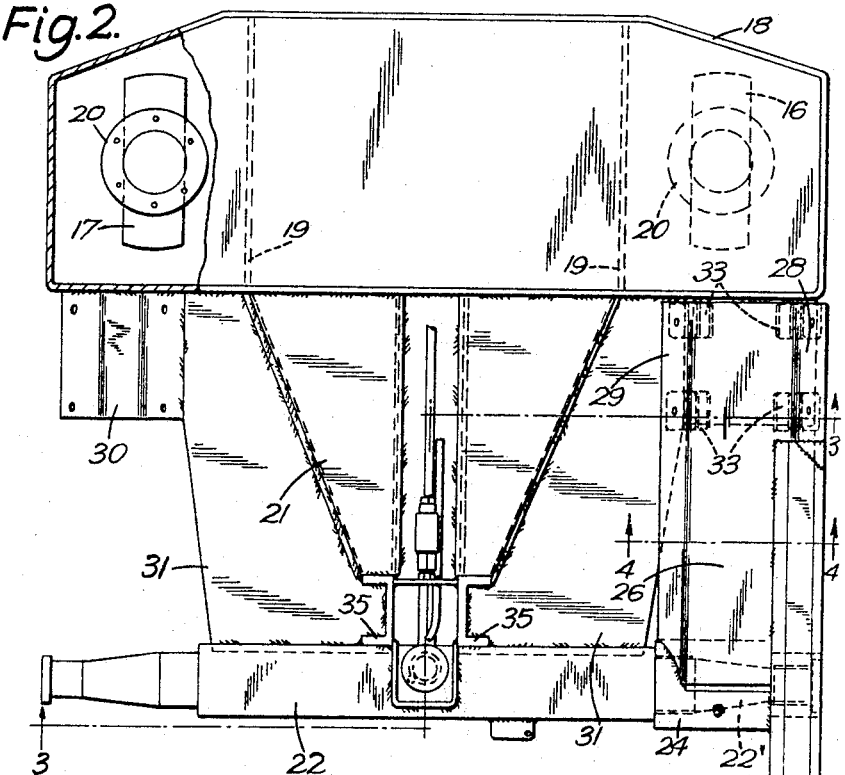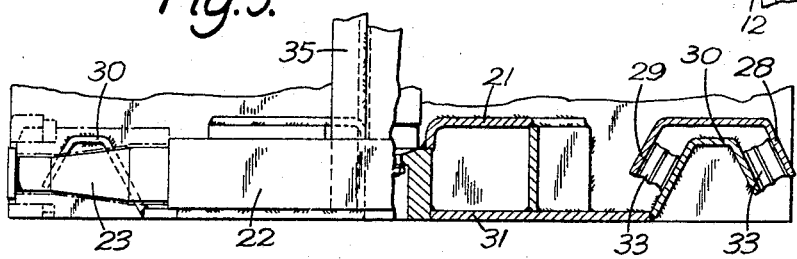

United States Patent Office 3,273,665
Patented Sept. 20, 1966

3,273,665
RUNNING GEAR ARRANGEMENT FOR
INDUSTRIAL TRUCKS
Cecil Goodacre, Basingstoke, England, assignor to Lansing Bagnall Limited, Basingstoke, England, a British company
Filed Aug. 4, 1964, Ser. No. 387,461
Claims priority, application Great Britain, Aug. 6, 1963, 31,053/63
3 Claims. Cl. (180—85)

This invention comprises improvements in or relating to industrial trucks.

According to the invention, there is provided an industrial load handling truck of the type comprising a body portion at one end thereof, a pair of transversely spaced straddle legs projecting away from the body portion and means for supporting the legs and the body portion from the ground, wherein each straddle leg is pivoted on the body portion independently of the other leg about a substantially horizontal axis extending transversely of the legs and resilient means are provided which co-operate between the legs and body portion to limit resiliently pivotal movement of the ends of the legs remote from the body portion.

The term "straddle legs" is used herein in a broad enough sense to include the side legs of a reach truck, that is, a truck in which a mast or other load-carrying element is mounted to move along guides on the side legs in a fore-and-aft direction, but it also includes legs without any such guides. One of the advantages of a construction according to this invention is that each of the legs, being pivoted, is easily detachable and other legs of different shape can easily be substituted on the same body. Also when the body has two wheels beneath it, the resilient connection of the straddle legs with the body enables the truck to run well and to rest firmly over uneven ground.

Preferably the legs are both pivoted on the body portion about the same transverse axis.

In one arrangement each leg has a part which projects from its pivot with the body portion towards the body-portion-end of the truck and with which the resilient means are arranged to co-operate.

The resilient means may conveniently be mounted on the body portion.

The resilient means may for example comprise buffers made of rubber or a like resilient material.

The means for supporting the legs and body portion from the ground may comprise a first wheel mounted on the end of one leg remote from the body portion, a second wheel similarily mounted on the other leg and a pair of wheels which are mounted on the body portion and at least one of which is driven by a motor also mounted in the body portion.

Further features of the invention will be apparent from the following which is a description, by way of example, of two constructions of truck according to the invention.

In the accompanying drawings:

FIGURE 2 is a plan of the body portion and part of the legs;

FIGURE 3 is a view, partly in section, upon the line 3—3 of FIGURE 2;

Figure 1:
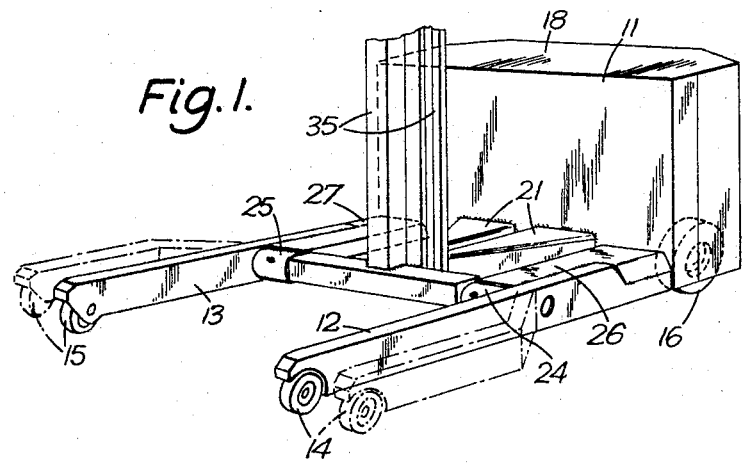
FIGURE 1 is a perspective view of the base portion of a masted straddle leg truck showing the invention.
Figure 4:
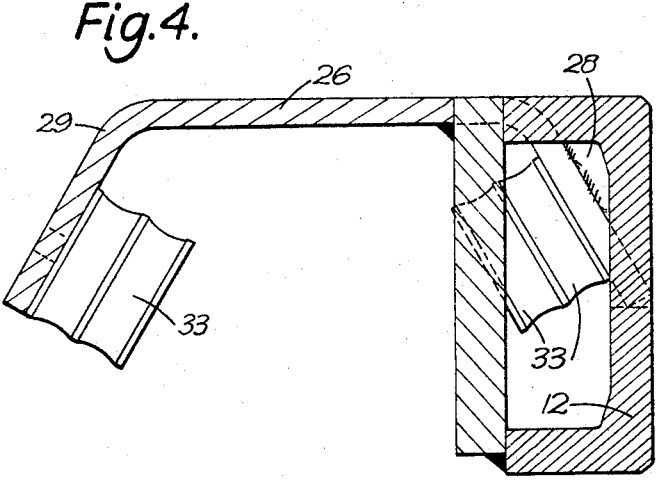
FIGURE 4 is a detail, showing a section on the line 4—4 of FIGURE 2.

The truck comprises a body portion 11 at its rear end and a pair of transversely spaced straddle legs 12, 13 projecting forwardly from the body portion. The legs and body portion are supported from the ground by means of a first wheel 14 mounted on the end of one leg remote from the body portion, a second wheel 15 similarly mounted on the other leg and a pair of transversely spaced steering and driving wheels 16, 17 mounted on the body portion 11. The driving wheels are steerable and are driven through drive connections by electric motors carried on turntable mountings 20 in a housing 18 (FIGURE 2) at the rearward end of the body portion 11, an electric storage battery also being carried in a space between walls 19 in the housing 18 for supplying electrical energy to the motor. The battery, motor drive and steering gear are of known construction and need not be further described.

The body portion 11 carries at its front portion a bracket 21 on which is a substantially horizonal transverse bar 22 which is spaced from the front end of the housing and on which the straddle legs 12, 13 are pivoted independently of one another about the axis of the bar, one leg 12 being on a bearing 22' at one end of the bar and the other leg 13 being on a bearing 23 at the other end. The legs have hubs 24, 25 which project inwardly and are machined to fit the bearings and, attached to these hubs are plates, 26, 27 which extend rearwardly from the pivots on the bar to a point spaced slightly forwardly of the front of the housing 11 and which have sloping side flanges 28, 29 overlying stop members 30 on the body portion. The stop members 30 project forwardly from the front of the housing 11 and are strengthened by attachment to a bottom plate 31 which unites them to the bracket 21. The side flanges 28, 29 and the stop members 30 are correspondingly shaped and are spaced from one another by means of resilient buffers 33 fixed to the stop members and the flanges. The resilient stops thus co-operate between the flanges and the stop members to limit resiliently pivotal movement of the legs 12, 13. The resilient stops 33 may be made of rubber or a like resilient material.

Fixed to the bracket 21 of the truck and extending upwardly from the transverse bar 22 is a most 35 on which a load-bearing carriage (not shown) is guided to move up and down. The load-bearing carriage has (as is usual) a pair of transversely spaced load-engaging fork arms which project forwardly from the mast and the dimensions of the fork arms and the spacing between them is such that when the carriage is at its lowermost position on the mast, the fork arms are between the straddle legs 12, 13 and their tips are approximately in line with the front ends of the legs, that is with the wheels 14, 15. Guided on the mast to move up and down with the carriage is a platform for an operator, which platform projects rearwardly from the mast and when in its lowermost position, lies in the space between the transverse bar 22 and the housing 18 of the body portion 11 of the truck.

It will be appreciated that the operation of the truck in handling pallets or the like is the same as with known straddle trucks. During operation, it is often necessary to move these trucks with the load in a raised, and therefore unstable, position and if the floor on which the truck is operating is uneven, these known straddle trucks tend to tilt, which sometimes results in their operating on three wheels. With the above-described truck, however, the resilient buffers 33 distribute the load on each wheel and allow all four wheels to keep in contact with the floor. This action moreover maintains the tractive grip of the driving wheels 16, 17 on the floor. Thus, unevenness of the floor is at least partly absorbed by the resilient stops and consequently the above-described truck is comparatively stable even when moving with a load in a raised position.

Figure 5:
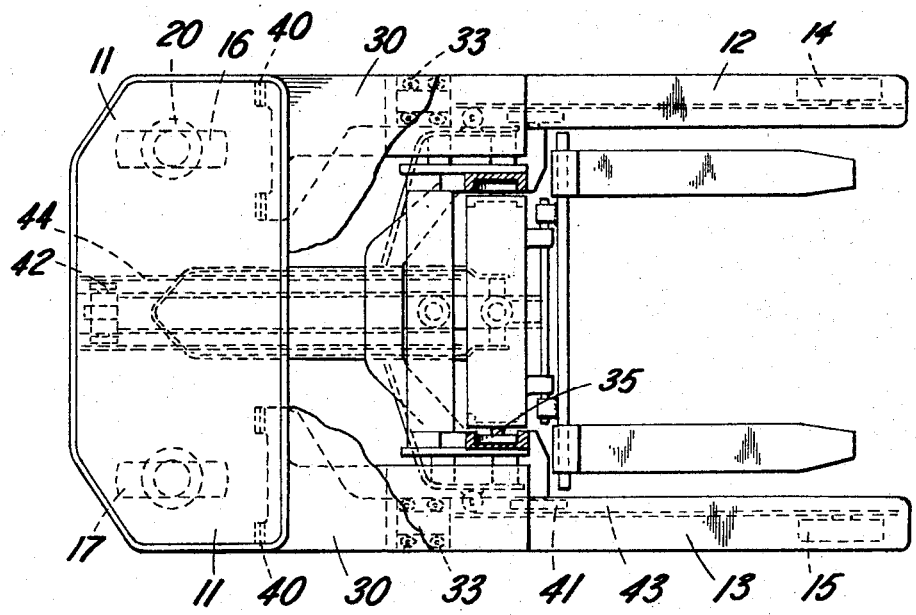
FIGURE 5 is a plan view of a second masted straddle leg truck showing the invention.

It will be appreciated that the invention is not limited to the precise construction described above. For instance, the truck could be a reach truck (see FIGURE 5) in which the mast 35, instead of being fixed to the body portion 11 of the truck, is movable forwardly and rearwardly of the truck by means of rollers 41, 42 and channels 43, 44 in the legs 12, 13 and the body portion 11, respectively. In this case, as the central portion of the truck, occupied by the bracket 21 and cross-bar 22 in the example described above, is utilised for the longitudinal movement of the mast 35, the pivots 40 for the legs 12, 13 are positioned at their ends adjacent the body portion 11 of the truck and the resilient buffers 33 are mounted between the legs 12, 13 and extensions 30 of the body portion at positions spaced forwardly of the pivots 40. The rear portion of the reach carriage is also provided with a pivoted roller carrier for the rollers 42 to allow for up and down movement of the legs 12, 13 about their pivots 40.

In FIGURE 1 there are shown in chain-line at 40, 41 the outlines of a modified shape of straddle legs in which the forwardly projecting portion is cranked outwardly to widen the space between them. The construction of the bar 22 and rear parts of the legs enables this modified shape of leg to be easily substituted for the other in cases where it is called for, without altering the rest of the design. This is a great advantage over the usual design with legs rigidly welded to the body of the truck, because with the usual design it is necessary to change the whole body and not the straddle legs only.

I claim:

1. An industrial load-handling truck having a body portion, an upstanding load-carrying mast supported by the body portion, a pair of transversely spaced straddle legs projecting from the body portion, each leg being pivotally mounted on the body portion independently of the other leg about a substantially horizontal axis extending transversely of the leg, a pair of wheels for supporting the body portion from the ground, which wheels are mounted in fixed vertical relation to and beneath the body portion, an electric motor for driving at least one of the wheels supporting the body portion, at least one wheel for supporting each leg from the ground, which wheel is mounted on the end of the leg remote from the body portion and in fixed vertical relation thereto, and resilient means located remote from the pivot axis between adjacent parts of each leg and the body portion to limit resiliently up and down pivotal movement of said end of the leg remote from the body portion.

2. A truck as claimed in claim 1 in which each leg is provided with a hub forming a pivotal bearing with a part of the body portion, which hub is provided with a plate fixed thereto and extending horizontally away from the end of the leg aforesaid over and adjacent to a part of the body portion and being spaced therefrom by resilient buffers which cooperate between the plate and the adjacent part of the body portion to limit resilient pivoted movement of the associated leg.

3. A truck as claimed in claim 1 wherein the truck is a reach truck in which the mast is movable forwardly and rearwardly of the truck and wherein the pivots for the legs are positioned at their ends adjacent the body portion of the truck and the resilient means are mounted between the legs and extensions of the body portion at positions spaced forwardly of the pivots.

References Cited by the Examiner

UNITED STATES PATENTS

| | | | |
|---|---|---|---|
| 1,763,535 | 6/1930 | Nuttall | 280—150 |
| 2,202,615 | 5/1940 | Barenyi | 267—63 |
| 2,753,946 | 7/1956 | Quayle | 180—52 X |
| 2,788,250 | 9/1957 | Blattner | 267—63 |
| 2,899,093 | 8/1959 | Morrell | 214—700 |
| 2,973,878 | 3/1961 | Gibson | 214—750 |
| 2,986,295 | 5/1961 | Shaffer | 214—730 |
| 3,042,424 | 7/1962 | Davis | 280—106.5 |
| 3,125,352 | 3/1964 | Gouin | 212—145 X |
| 3,170,706 | 2/1965 | Nichols | 280—43.12 |

KENNETH H. BETTS, *Primary Examiner.*